Patented July 1, 1930

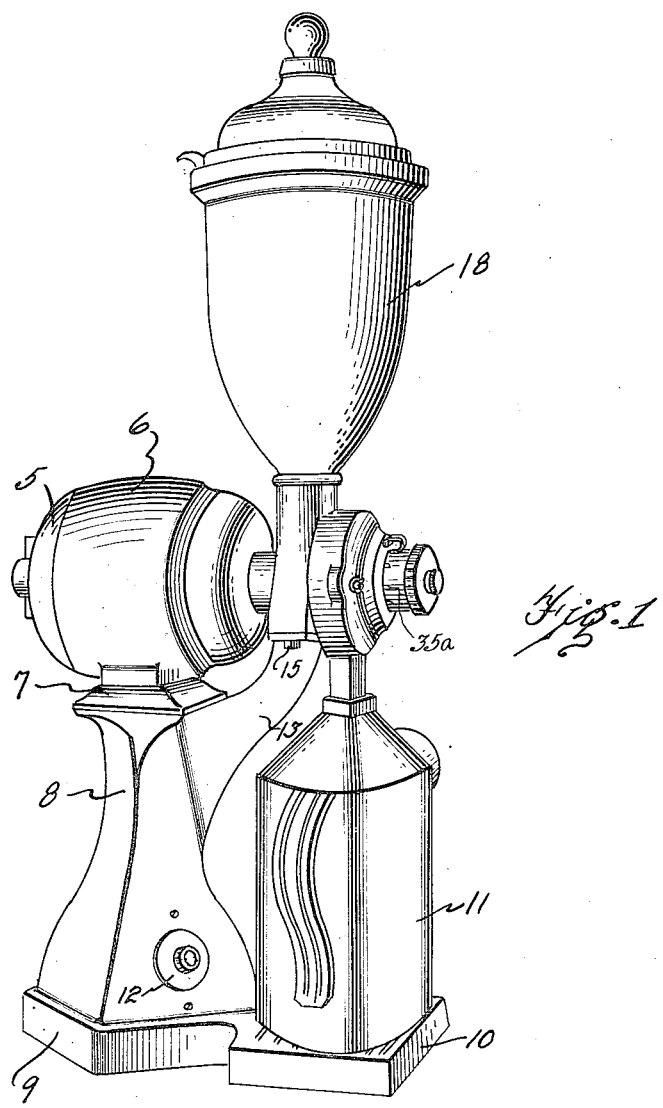

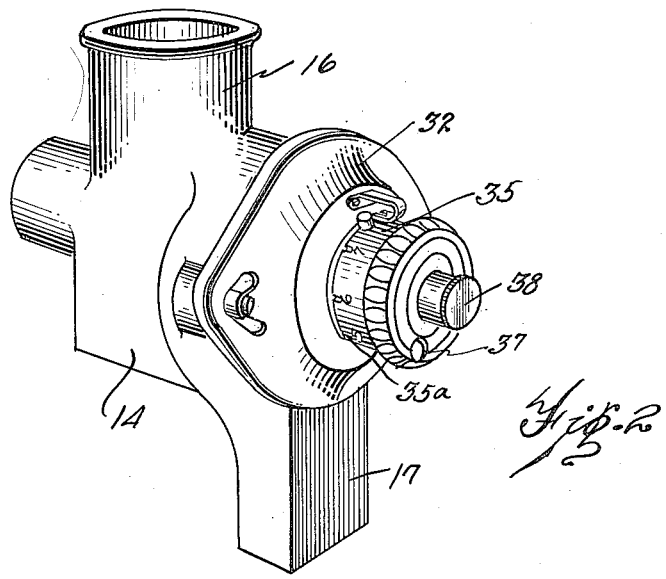
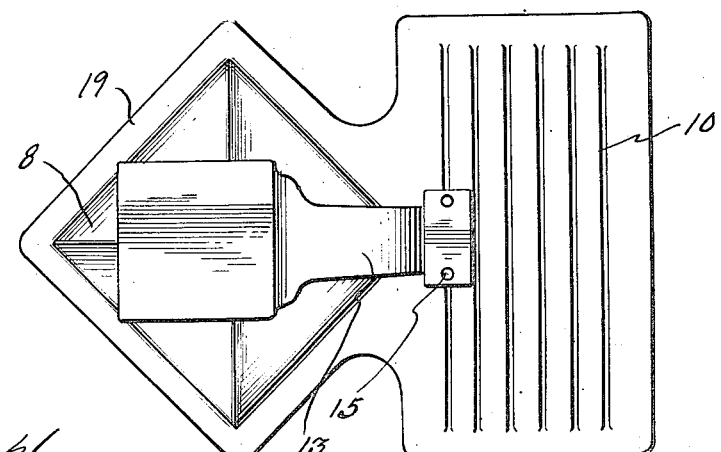

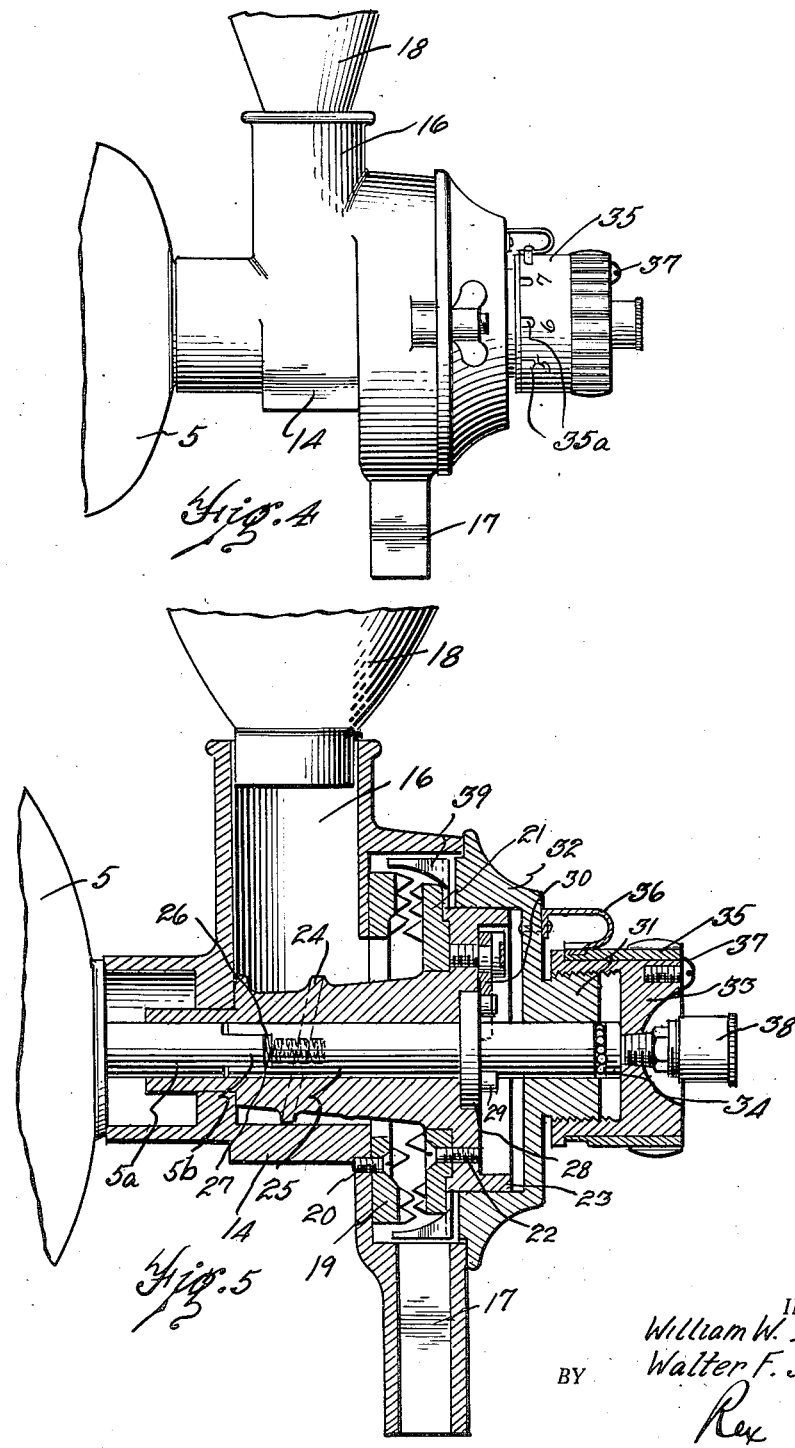

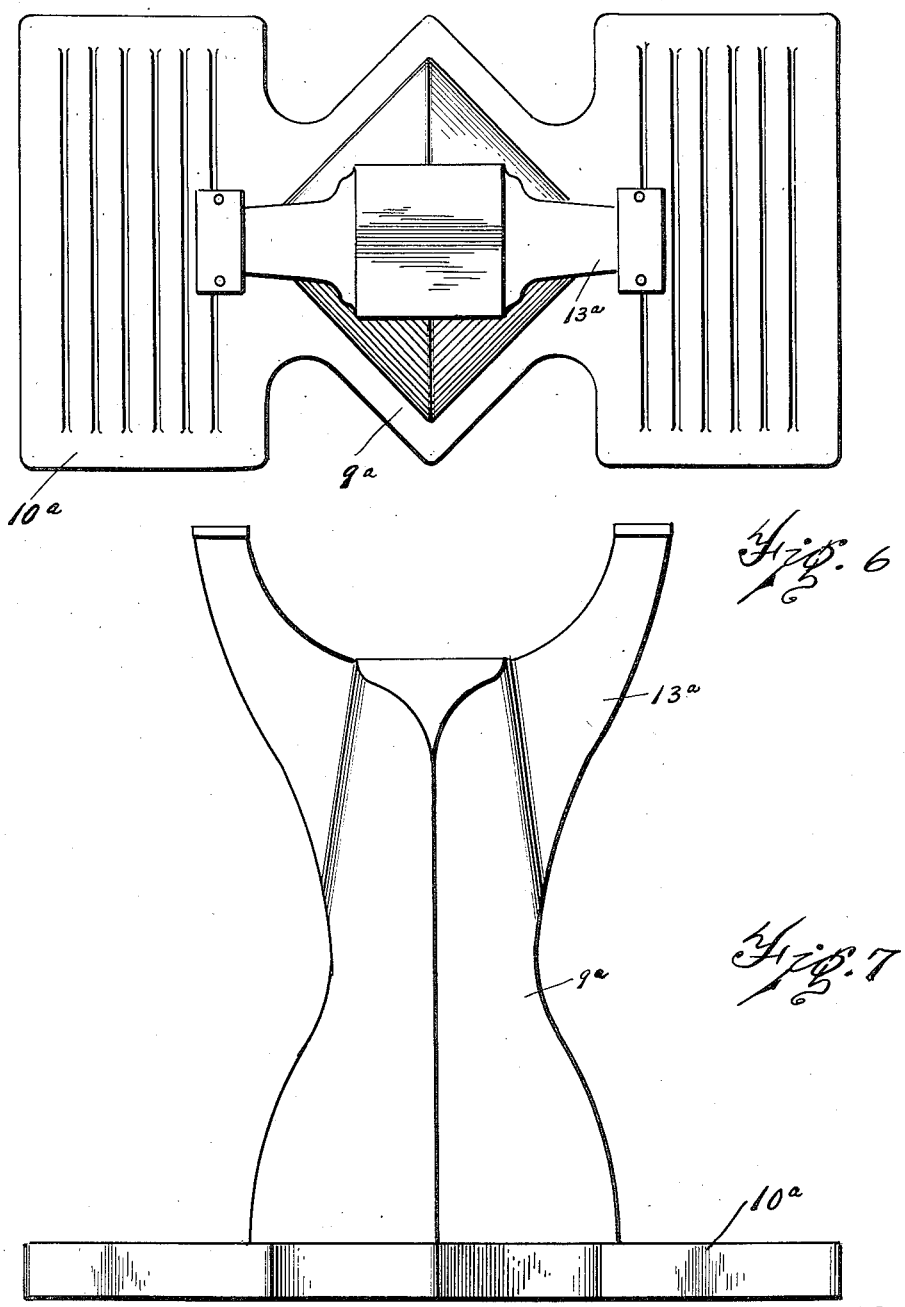

1,769,776

UNITED STATES PATENT OFFICE

WILLIAM W. DRYDEN AND WALTER F. STIMPSON, OF LOUISVILLE, KENTUCKY; SAID DRYDEN ASSIGNOR TO SAID STIMPSON

COFFEE MILL

Application filed September 8, 1924. Serial No. 736,463.

This invention relates to improvements in power-driven coffee mills and similar grinding devices and aims to simplify the construction and assembly of such grinding mechanism as well as adapt them to the practical needs of the present day merchant. More specifically, this invention has for one of its objects the rigid mounting of the grinding mechanism and hopper on a projecting arm of the base carrying the motor, or other sources of power, instead of on the end plate of the motor as in the mills now in general use, whereby direct or alternating current motors may be interchangeably used with the same grinding mechanism or the motor may be removed at will for repairs without impairing the fixed mounting or the adjustment of the grinding mechanism.

Another object of the invention is the provision of simple and effective means for minutely varying the distance between the fixed and rotatable grinding burrs to permit graduations of fineness in grinding or pulverizing coffee and the like, and permitting change in such adjustments while the grinding mechanism is operating.

A further object of the invention is the arrangement of the supporting base to occupy a minimum of counter space, while more efficiently bracing the motor and grinding mechanism than in the mills in ordinary use.

Other objects and advantages will be apparent from the following description, wherein reference is made to the accompanying drawings illustrating a preferred embodiment of the invention and wherein similar reference numerals designate similar parts throughout the several views.

In the drawings:

Fig. 1 is a perspective view of a coffee mill constructed in accordance with this invention.

Fig. 2 is a detail perspective view of the grinding mechanism casing.

Fig. 3 is a detail plan view of the supporting base.

Fig. 4 is a side elevation of the grinding mechanism and associated parts.

Fig. 5 is a central sectional view through the mechanism shown in Fig. 4.

Fig. 6 is a plan view of a modified form of supporting base, whereby duplex grinding mechanism may be mounted on the same base, and Fig. 7 is a side elevation thereof.

The numeral 5 designates an electric motor of any desired shape or size, preferably inclosed in a casing 6 formed with a substantially square foot portion 7 adapted to be secured upon a support 8. The support 8 is herein shown as a casting having a base 9 substantially square in contour with a floor portion 10 extending from one corner of the base for the reception of the can or bin 11 for receiving the ground coffee or other grain. The motor 5 is so positioned upon the support 8 that its shaft is parallel with one of the diagonal axes of the square base 9, whereby the base occupies a minimum of counter space and yet braces the motor and associated parts against vibration and tipping as effectively as though the usual type of base were employed. A switch 12 is mounted on the support 8 and governs the flow of current to the motor 5 from a floor plug or other suitable connection with a power source. It will be understood that the motor 5 may be of the direct or alternating current type and that one type may be substituted for another upon the support 8 without affecting the remaining mechanism of our improved coffee mill.

The grinding mechanism as well as the hopper for containing the coffee to be ground is secured upon an arm 13 projecting upwardly and forwardly above one corner of the square base 9, substantially as shown in Figs. 1 and 3, whereby the grinding mechanism and associated parts may be permanently secured upon the support 8 and need not be removed when the motor 5 is removed for repairs or substitution. The grinding mechanism is inclosed within a casing 14 adapted to be secured upon the projecting arm 13 by bolts 15 or the like, and comprises an inlet spout 16 and outlet throat 17 with space for the fixed and rotatable grinding elements therebetween. A hopper 18 of any desired size and shape is seated in the inlet spout 16 and has an open bottom communicating with such spout for delivering the coffee or other grains to the grinding mechanism.

The grinding mechanism as herein shown comprises a fixed grinding plate 19 secured, as by the screws 20, upon the casing 14 and provided with suitable burrs for co-acting with similar burrs upon the rotatable grinding disc 21 fixed, as by the screws 22, upon the flange portion 23 of the rotatable grinding element, which is formed as a casting with an elongated worm portion 24 adapted to overlie the projecting end of the driving shaft 5ª of the motor and the adjacent portion of the driven shaft 25 (note Fig. 5). The driving shaft 5ª is preferably formed with a longitudinally projecting tongue 5ᵇ adapted to slide within the slot 26 in the adjacent end of the driven shaft 25, a spring 27 in such socket contacting the extremity of the tongue 5ᵇ for permitting adjustment of the driven shaft, as hereinafter described. The driven shaft 25 is formed with a flange 28 adapted to fit snugly within a circular groove in the rotatable grinding element 23, and is provided with a plurality of driving lugs 29 adapted to co-act with a driving plate 30 pivoted upon the rotatable grinding element, whereby an automatically releasable connecting device is provided between the driven shaft 25 and the rotatable grinding element which will disengage whenever a nail or other obstruction is encountered. This automatic release is not claimed in the present application, but is disclosed and claimed in U. S. Patent Number 1,587,104.

Provision is made for varying the distance between the fixed and rotatable grinding plates either before or during the rotation of the movable plate. As herein shown a threaded stem 31 is formed on the projecting extremity of the casing closure plate 32 and is provided with a central bore for the passage of the driven shaft 25. A cap 33 threads upon such stem and when advanced to a certain point in such threading movement contacts with a bearing 34 in which the end of the driven shaft seats. Then further threading movement upon the stem 31 will force the shaft 25 longitudinally against the tension of the spring 27 contacting the end of the drive shaft 5ª and thereby moves the rotatable grinding disc 21 toward the fixed grinding disc 19. In practice, the cap 33 is threaded upon the stem 31 until the distance between the fixed and rotatable grinding plates is that necessary for securing the very finest pulverization of coffee or other grains. Then a graduated sleeve 35 is fitted over the periphery of the cap 33 with its zero indication aligning with a spring indicating finger 36 fixed upon the casing above the inner extremity of the sleeve. As herein shown the sleeve 35 is formed with a plurality of notches 35ª circumferentially spaced about its periphery with successive indications adjacent the notches so that the sleeve 35 and cap 33 may be turned through any desired degree to vary the position of the rotatable grinding disc 21. By forming the sleeve 35 separate from the cap 33 we are enabled to quickly locate the zero notch of the sleeve in alignment with the indicating finger 36 regardless of the extent of threading needed to bring each particular grinding disc into the position desired for the finest grind. The sleeve 35 is then secured to the cap 33 by means of the screw 37 (see Fig. 5) and thereafter the sleeve 35 and cap 33 turn as a unit. It will be noted that when the distance between the grinding discs is that needed for the finest grind that the spring 27 engaging the driving shaft 5ª will be compressed to its greatest extent, and when the sleeve 35 is rotated to unthread the cap 33 the pressure of the spring 27 slides the driven shaft 25 so that it maintains contact with the inner face of the cap 33, moving the rotatable grinding disc 21 therewith to increase the distance between the grinding discs.

The cap 33 may also be utilized to locate a grease cup 38 for lubricating the shaft 25 and other rotatable elements. As herein shown, an extensible grease cup 38 is centrally mounted upon the cap 33 and is adapted to force lubricant into suitable grooves in the shaft 25.

The operation of our improved coffee mill is believed to be apparent. Whenever coffee to be ground is placed in the hopper 18 it falls through the inlet 16 to that portion of the casing 14 adjacent the worm 24, and is then fed by the worm between the fixed and rotatable grinding discs. The worm 24 as well as the rotatable grinding disc 21 is revolved by the driven shaft 25 at any desired speed, as regulated by the speed of the motor 5, and the grinding action is continued until the coffee reaches the desired degree of fineness, whereupon it falls from between the grinding discs into the outlet throat 17 and thence into the receiving can 11. Suitable fins 39 may be secured upon the grinding disc 21 to prevent the packing of ground coffee in the casting exteriorly of the grinding discs. Whenever a different degree of fineness is desired, the sleeve 35 and cap 33 are rotated to bring the desired notch on the sleeve into engagement with the spring finger 36, and such turning movement of the cap 33 will change the distance between the fixed and rotatable grinding discs in accordance with the direction and extent of rotation of the cap. The receiving can 11 preferably rests upon the seat 10 forming part of the base of support 8, as this construction both provides an easy method of properly locating the receiving can and also gives a more sturdy support for the grinding mechanism and hopper, effectively preventing any tipping of the mill even when the hopper is quickly filled.

In Figs. 6 and 7 we have shown an arrangement for supporting two grinding mechanisms on the same base. The grinding mechanisms may be duplicates, or one may be arranged for grinding one material and the other for a different material, or varying degrees of adjustment between the grinding burrs may be provided in the two mechanisms. Thus one grinding mechanism may be arranged for coarse grinding and the other for pulverizing coffee or the like. The base 9ª is substantially identical with the base 9 shown in the preferred embodiment, except that duplicate bracket arms 13ª extend outwardly and upwardly from opposite corners of the square base. Duplicate floor portions 10ª extend from opposite corners of the base 9ª for the reception of the receiving cans or bins substantially as shown in Figs. 6 and 7. The grinding mechanisms are respectively secured to the bracket arms 13ª while the motor, centrally mounted between the bracket arms, may simultaneously drive both grinding mechanisms.

While it will be apparent that the illustrated embodiment of our invention herein disclosed is well calculated to adequately fulfill the objects and advantages primarily stated, it is to be understood that the invention is susceptible to variation, modification and change within the spirit and scope of the subjoined claims.

Having described our invention, we claim—

1. In a device of the character described, a casing having an inlet spout for the material to be ground, a grinding member fixed upon the casing, a driving shaft having a tongue, a driven shaft having a socket for receiving said tongue, a spring mounted in the socket and engaging the end of the tongue, a rotatable grinding member connected wth the driven shaft, and means for longitudinally moving the driven shaft against the tension of the spring to move the rotatable grinding member toward the fixed grinding member comprising a bearing member in which one extremity of the driven shaft is seated, and a member threaded upon the casing and engaging said bearing member.

2. In a device of the character described, a casing having an inlet spout for the material to be ground, a grinding member fixed upon the casing, a driving shaft having a tongue, a driven shaft having a socket for receiving said tongue, a spring mounted in the socket and engaging the end of the tongue, a rotatable grinding member connected with the driven shaft, and means for longitudinally moving the driven shaft against the tension of the spring to move the rotatable grinding member toward the fixed grinding member comprising a bearing member in which one extremity of the driven shaft is seated, and a member threaded upon the casing and engaging said bearing member, an indicating sleeve loosely fitted over the threaded member, and means for securing the sleeve to turn with the threaded member.

3. In a device of the character described, a casing having an inlet spout for the material to be ground, a grinding member fixed upon the casing, a driving shaft having a tongue, a driven shaft having a socket for receiving said tongue, a spring mounted in the socket and engaging the end of the tongue, a rotatable grinding member connected with the driven shaft, and means for longitudinally moving the driven shaft against the tension of the spring to move the rotatable grinding member toward the fixed grinding member comprising a bearing member in which one extremity of the driven shaft is seated, and a member threaded upon the casing and engaging said bearing member, an indicating sleeve loosely fitted over the threaded member, means for securing the sleeve to turn with the threaded member, and a spring finger coacting with said sleeve for indicating purposes and adapted to hold the threaded member in any adjusted position.

In witness whereof we hereunto set our hands.

WILLIAM W. DRYDEN.
WALTER F. STIMPSON.